US005248560A

United States Patent [19]

Baker et al.

[11] Patent Number: 5,248,560

[45] Date of Patent: Sep. 28, 1993

[54] FILLED URETHANE DEVELOPER ROLLER

[75] Inventors: Ronald W. Baker, Versailles; Bradley L. Beach, Lexington; Ronald L. Roe, Lexington; Donald W. Stafford, Lexington, all of Ky.

[73] Assignee: Lexmark International, Inc., Greenwich, Conn.

[21] Appl. No.: 879,496

[22] Filed: May 7, 1992

[51] Int. Cl.[5] ..................... B32B 27/00; G03G 13/00; G03G 9/00

[52] U.S. Cl. ................................ 428/425.8; 355/245; 430/31; 430/110

[58] Field of Search ..................... 428/425.8; 355/245; 430/31, 110

[56] References Cited

U.S. PATENT DOCUMENTS

| | | | |
|---|---|---|---|
| 3,664,941 | 5/1972 | Jelfo | 430/38 |
| 4,257,699 | 3/1981 | Lentz | 355/3 FU |
| 4,710,015 | 12/1987 | Takeda et al. | 355/3 DD |
| 4,828,951 | 5/1989 | Kaneko et al. | 430/47 |
| 4,935,782 | 6/1990 | Kohyama | 355/245 |
| 5,009,973 | 4/1991 | Yoshida et al. | 430/45 |

*Primary Examiner*—John Kight, III
*Assistant Examiner*—T. Mosley
*Attorney, Agent, or Firm*—John A. Brady

[57] ABSTRACT

A semiconductive developer roll is disclosed having a conductive shaft and a single outer member of polyester urethane in which copper (II) chloride is dissolved. Performance is enhanced by the addition of some silicone oil.

20 Claims, No Drawings

FILLED URETHANE DEVELOPER ROLLER

TECHNICAL FIELD

This invention relates to developer rollers used in electrophotography, and more specifically, to formulations to eliminate an outer coating typically used with such rolls.

BACKGROUND OF THE INVENTION

Existing developer rollers which this invention replaces are semiconductive rubber with a thin, outer insulation layer of polyurethane. Such rollers have a conductive center shaft to which an electrical potential is applied which is approximately one-half of the potential to which non-image areas of a photoconductive surface are charged, with the image areas being substantially at zero volts. Toner powder is separately charged, applied to the developer roller, and regulated in thickness and charge by an electrically charged doctor blade as the developer roller is turned. The developer roller then makes nip contact with the photoconductive surface, which typically is a roller or belt moving with the developer roller.

A developer roller of one material on the shaft having interchangeable function with the existing roller has significant potential savings in manufacture since it would not require a separate coating. This invention provides such a roller in which the material is metal-salt-containing urethane which may be molded on the core in one step.

U.S. Pat. No. 4,257,699 to Lentz teaches a wide range of metals including specific mention of copper chloride in a multilayer fuser roller, while the subject invention is a single layer developer roller. This patent also teaches inclusion of silicone oil, which is a beneficial, but not essential, ingredient in the subject invention. U.S. Pat. No. 4,710,015 to Takeda et al teaches a two layer developer roller with additives of copper, nickel and carbon black.

DISCLOSURE OF THE INVENTION

This invention is a semiconductive developer roller for electrophotography having a conductive core and a single outer member of polyurethane in which a metal halide (copper II chloride) is dissolved. Performance is enhanced by the addition of some silicone oil.

BEST MODE FOR CARRYING OUT THE INVENTION

Brand named materials in the following formulas are chemically as follows:

Vibrathane 8011 (Uniroyal Chemical Co., Inc. tradename) is a polyester urethane based on toluene diisocyanate. It has a solidification pt. of <22C. It has 2.4 to 9.3% reactive isocyanate. It has a specific gravity of 1.15 to 1.22.

Voranol 234-630 (Dow Chemical Co. tradename) is a polyfunctional polyol based on trimethylol propane. CAS #050586-59-9.

DC200 silicone oil (Dow Corning Corp. tradename) with a viscosity of 50 cs is a linear polydimethyl siloxane. CAS #63148-62-9.

Staboxal 1 (Mobay Chemical Co. tradename) is 2,2',6,6' Tetetraisopropyl diphenyl carbodiimide. CAS #2162-74-5.

Pluracol TP-440 (R) (BASF Corp. tradename) is a polyether polyol. CAS #25723-16-4.

Alternative formulas for the unitary material molded on a metal core to form a developer roller are as follows: All parts are by weight. Formula 1 is the most studied and is preferred on that basis.

| Parts | Component |
|---|---|
| | **Formula 1** |
| | By Tradenames |
| 100 | Vibrathane 8011 (Uniroyal Chemical Co., Inc. tradename) |
| *7.04 | Voranol 234-630 (Dow Chemical Co. tradename) |
| 0.0040 | Copper (II) Chloride 97% purity from Aldrich Chemical |
| 3.0 | DC200 silicone oil (Dow corning Corp. tradename) with viscosity of 50 cs |
| | By Chemical Name |
| 100 | Polyester-Toluene Diisocyanate Prepolymer |
| 7.04 | Polyfunctional polyol |
| 0.0040 | Copper (II) Chloride |
| 3.0 | Silicone oil with a viscosity of 50 cs |
| | **Formula 2** |
| | By Tradenames |
| 100 | Vibrathane 8011 (Uniroyal Chemical Co., Inc. tradename) |
| *7.04 | Voranol 234-630 (Dow Chemical Co. tradename) |
| 0.32 | Copper (II) Chloride 97% purity from Aldrich Chemical |
| 2 | Staboxal 1 (Mobay Chemical Co. tradename) |
| | By Chemical Names |
| 100 | Polyester-Toluene Diisocyanate Prepolymer |
| 7.04 | Polyfunctional polyol |
| 0.32 | Copper (II) Chloride |
| 2 | 2,2',6,6' Tetraisopropyl Diphenyl Carbodiimide |
| | **Formula 3** |
| | By Tradenames |
| 100 | Vibrathane 8011 (Uniroyal Chemical Co., Inc. tradename) |
| *7.04 | Voranol 234-630 (Dow Chemical Co. tradename) |
| 0.25 | Lithium Chloride |
| 2 | Staboxal 1 (Mobay Chemical Co. tradename) |
| | By Chemical Names |
| 100 | Polyester-Toluene Diisocyanate Prepolymer |
| 7.04 | Polyfunctional polyol |
| 0.25 | Lithium Chloride |
| 2 | 2,2',6,6' Tetraisopropyl Diphenyl Carbodiimide |
| | **Formula 4** |
| | By Tradenames |
| 100 | Vibrathane (R) 8011 (Uniroyal Chemical Co., Inc. tradename) |
| **11.15 | Pluracol TP-440 (R) (BASF Corp.) |
| 0.32 | Copper (II) Chloride 97% purity from Aldrich Chemical |
| 2 | Staboxal (R) 1 (Mobay Chemical Co. tradename) |
| | By Chemical Name |
| 100 | Polyester-Toluene Diisocyanate Prepolymer |
| 11.15 | Polyfunctional polyol |
| 0.32 | Copper (II) Chloride |
| 2 | 2,2',6,6' Tetraisopropyl Diphenyl Carbodiimide |

*The quantity of Voranol 234-630 is adjusted for its equivalent weight to get a stoichiometry of 95%.

**The quantity of Pluracol TP-440 is adjusted for its equivalent weight to get a stoichiometry of 95%.

Molding Process

The following is specific to Formula 1. Molding the other formulas would be closely similar.

1. All raw materials are kept dry. Unground copper chloride is kept in an oven at 130C.
2. Heat curative (the poly functional polyol) to 130C.
3. Grind the copper chloride to a fine powder with a mortar and pestle.
4. Add ground copper chloride to curative.
5. Mix curative and copper chloride for 1 hour with a propeller mixer.
6. Add the silicone oil to the curative mixture.
7. Mix for 5 minutes.
8. The prepolymer is in liquid form for mixing. This can be achieved by equilibrating the material to a uniform temperature of 60C.
9. Degas the curative mixture and prepolymer by applying a vacuum until bubbling stops. This step is performed immediately before the final mix step.
10. Mix the prepolymer and curative mixture in the proper proportions with an in-line high speed propeller mixer.
11. Inject into a 93C temperature roller mold containing a metal core.
12. Continue mold temperature at 93C, demold the part after 3.5 hrs.
13. Post cure for 10 hours at 130C.

The resulting roller is a semiconductive, somewhat yieldable roller having stable electrical and physical characteristics since the metal salt is nonmigrating. Conductivity is somewhat higher than the roller it replaces which permits higher imaging speeds.

The metallic salt is dispersed or dissolved in a portion of the urethane. The preparation for casting into a mold permits a portion of the metallic salt to dissolve in the components. This dissolution forms ions of the metal and its counterion, which are the source of the conductivity. Higher proportion may be used to assure sufficient dissolution, but amounts exceeding 0.1 gr probably will not fully dissolve and would not affect conductivity, and may act as particles which could cause defects.

This invention eliminates the outer layer, which permits costs savings in manufacture. The roller is very consistent during use and capable of development speeds up to 50% faster than that of the previous coated roller.

The silicone oil seems to have surface effects which reduce the amount of toner of the wrong (opposite to desired) charge passing the doctor blade. Also, it has desired triboelectric properties for toner to be charged negatively. Other modifications and additives may be readily made without changing the essential character of this invention.

We claim:

1. A developer roller comprising a conductive core and only a single, outer semiconductive member on said core, said outer member being polyurethane with a metal halide salt dissolved in said polyurethane.

2. The roller as in claim 1 in which said polyurethane is polyester polyurethane.

3. The roller as in claim 2 in which said metal salt is copper (II) halide.

4. The roller as in claim 1 in which said metal salt is copper (II) halide.

5. The roller as in claim 4 in which said polyurethane is a reaction product of about 100 parts by weight polyester toluene diisocyanate urethane and about 7 parts by weight polytrimethylol propane.

6. The roller as in claim 2 in which said polyurethane is a reaction product of about 100 parts by weight polyester toluene diisocyanate and about 7 parts by weight polytrimethylol propane.

7. The roller as in claim 6, also comprising about 3 parts by weight silicone oil in said outer member.

8. The roller as in claim 1 also comprising silicone oil in said outer member.

9. The roller as in claim 2 also comprising silicone oil in said outer member.

10. The roller as in claim 3 also comprising silicone oil in said outer member.

11. The roller as in claim 4 also comprising silicone oil in said outer member.

12. The roller as in claim 5 also comprising about 3 parts by weight silicone oil in said outer member.

13. A developer roller comprising a conductive core and only a single, outer semiconductive member on, said core, said outer member being polyurethane cured from polyester polyurethane with a polyol in the presence of a thoroughly disposed metal halide salt.

14. The roller as in claim 13 in which said metal salt is copper (II) halide.

15. The roller as in claim 14 in which polyurethane is about 100 parts by weight and said polyol is about 7 parts by weight polytrimethylol propane.

16. The roller as in claim 13 in which polyurethane is about 100 parts by weight and said polyol is about 7 parts by weight polytrimethylol propane.

17. The roller as in claim 16 also comprising about 3 parts by weight silicone oil in said outer member.

18. The roller as in claim 13 also comprising silicone oil in said outer member.

19. The roller as in claim 14 also comprising silicone oil in said outer member.

20. The roller as in claim 15 also comprising about 3 parts by weight silicone oil in said outer member.

* * * * *